Mar. 20, 1923.

C. M. LARSON 1,449,334

DILUTOMETER

Filed Apr. 4, 1921

Witness,
S. B. Mann

Inventor,
Clifford M. Larson.

Patented Mar. 20, 1923.

1,449,334

UNITED STATES PATENT OFFICE.

CLIFFORD M. LARSON, OF CHICAGO, ILLINOIS.

DILUTOMETER.

Application filed April 4, 1921. Serial No. 458,287.

*To all whom it may concern:*

Be it known that I, CLIFFORD M. LARSON, a citizen of the United States, residing in the city of Chicago, county of Cook, and State of Illinois, have invented certain new and useful Improvements in Dilutometers, of which the following is a specification.

This invention relates to improvements in dilutometers and refers more particularly to a device for ascertaining the relative gravity of crank case oil or any liquid after being used in a machine for lubrication or used in any process in which the relative gravities of the liquid before and after use are essential.

I describe the invention particularly with its use in connection with ascertaining the quality and lubricating properties of crank case oil. It will be understood that the device is applicable to any process or apparatus to which it might be attached where relative gravities are of importance.

The dilution of motor oil in the crank case is a serious factor as the motorist has no means of ascertaining the quality of the oil in the crank case other than its general appearance and has no accurate means for telling whether the oil in the crank case is supplying the proper lubrication to his motor. The crank case lubricating fluid is impaired principally by leakage of the unconsumed heavy ends of the fuel past the pistons. These heavy ends accumulate and dilute the crank case lubricant until it is divested of its lubricating properties. At the present time, this lubricant is changed at comparatively regular intervals as a matter of custom as no accurate determination can be made as to its lubricating quality.

Figure 1:
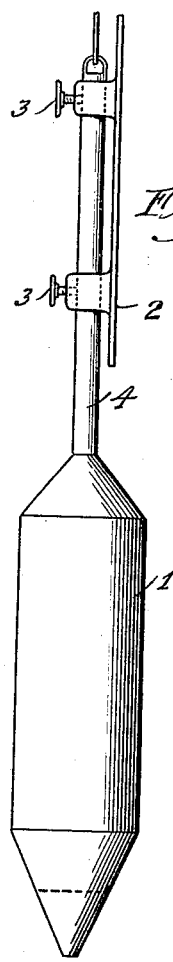
Fig. 1 is an elevational view of the device showing the graduating attachment in profile.
Figure 2:
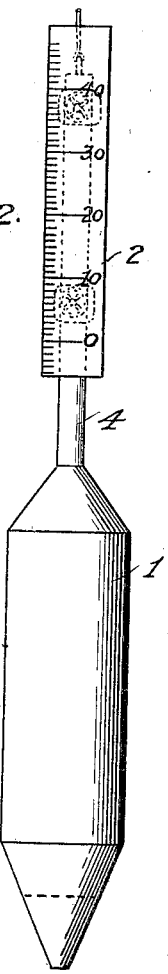
Fig. 2 is a similar elevation showing a face view of the graduating attachment.

By the use of this device, which consists of a weighted bulb 1 and an adjustable scale 2 held in place by thumb screws 3 at the desired position on the stem 4 of the device, it is possible to determine the relative percentage of dilution as well as the period at which the oil has served its purpose as a lubricant and is no longer sufficiently effective. This device, by adjusting the scale may be made to serve for the different types of oil made from the various crudes, that is, ranging from the low gravity asphaltic oils to the high gravity eastern or paraffine oil. The principle involved is that the oil which is diluted becomes lower in gravity as it is used. This dilution allows the dilutometer to sink further below the surface of the oil, the reading being readily made upon the adjustable graduated attachment. By setting the stem graduation for the new unused motor oil at zero, and determining from dilution the relative gravity at which the lubricant becomes ineffective to a degree to be objectionable as a lubricant it can be determined when the used oil from the same base is diluted beyond the suitability point by the number of graduations which the stem attachment registers. In this connection, attention is called to the fact that the device is not restricted to use with crank case oil as it is operable in telling relative gravities with any type of liquid. The apparatus also covers types which may be directly attached to the crank case of the engine or in the form of a hand apparatus shown in Figs. 1 and 2, the use of which would necessitate the removal of a sample of the oil from the crank case.

Figure 3:
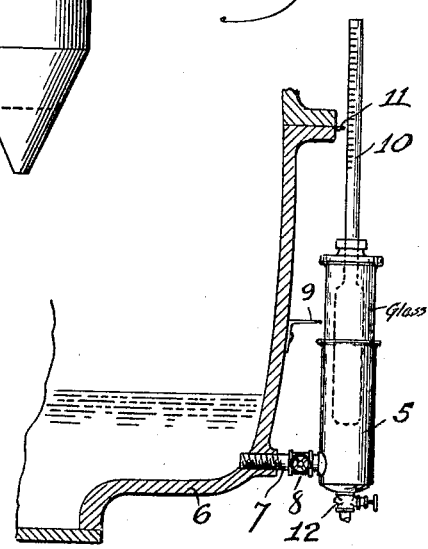
Fig. 3 is a view of the attachment as it may be fixedly connected to a crank case.

The fixed type shown in Fig. 3 comprises a hollow cylindrical tube 5 attached to and connected with the crank case 6 by means of the pipe connection 7 controlled by a stop cock 8. When it is desired to ascertain the character of the crank case lubricant the stop cock 8 is opened and the oil permitted to rise in the cylinder 5 to a fixed level shown at 9. Prior to this a fixed reading has been made upon the stem of the attachment 10 which is placed in the cylinder, the cylinder at that time being filled with a clean oil before putting it into the crank case. This reading was made by the position of the stem graduations with a sight gauge member 11 attached to the crank case and cooperating with the graduations on the stem to inform the motorist when his crank case oil has been diluted to an objectionable amount. The comparative difference between the initial reading with the clean oil and the second reading with oil drawn from the crank case with the pet cock 7 will give accurately the extent of this dilution. After the reading has been made, the oil may be drawn off from the drain cock 12.

Where the cylindrical member 5 is attached fixedly to the crank case, the dilutometer may be kept in the cylinder or removed after each reading as desired. Also the dilutometer adapted for this latter use must be so constructed that the graduated stem will not be immersed in the oil as with the hand apparatus shown in Figs. 1 and 2.

I claim as my invention:

1. In a device of the character described, the combination with a member adapted to float vertically in a liquid body, of an adjustable scale positioned on said member for registering relative gravities.

2. In a device of the character described, the combination with a float element, of an adjustable scale, positioned thereon, means for positioning the scale to register the level at a selected figure in a predetermined type of lubricant, whereby comparative registrations will be effected on used oils.

3. In a device of the character described, the combination with a float element, of an adjustable scale positioned thereon, means for positioning the scale to register the level at a critical gravity relative to its lubricating proclivities whereby an accurate check may be kept upon the lubricant used.

CLIFFORD M. LARSON.